US012292701B2

(12) United States Patent
Nishiyama

(10) Patent No.: US 12,292,701 B2
(45) **Date of Patent: *May 6, 2025**

(54) IMAGE FORMING APPARATUS

(71) Applicant: BROTHER KOGYO KABUSHIKI KAISHA, Nagoya (JP)

(72) Inventor: Hideshi Nishiyama, Owariasahi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,691

(22) Filed: Feb. 20, 2024

(65) Prior Publication Data

US 2024/0192622 A1 Jun. 13, 2024

Related U.S. Application Data

(63) Continuation of application No. 17/930,108, filed on Sep. 7, 2022, now Pat. No. 11,947,277, which is a (Continued)

(30) Foreign Application Priority Data

Feb. 28, 2019 (JP) ................................ 2019-035417

(51) Int. Cl.
*G03G 15/08* (2006.01)
*G03G 21/16* (2006.01)

(52) U.S. Cl.
CPC ..... *G03G 15/0806* (2013.01); *G03G 21/1647* (2013.01); *G03G 21/1676* (2013.01)

(58) Field of Classification Search
CPC ........... G03G 15/0806; G03G 21/1647; G03G 21/1676
See application file for complete search history.

(56) References Cited

U.S. PATENT DOCUMENTS

2004/0170448 A1 9/2004 Tanaka
2006/0291900 A1 12/2006 Ozawa et al.
(Continued)

FOREIGN PATENT DOCUMENTS

JP 60-201371 A 10/1985
JP 2004-264460 A 9/2004
(Continued)

OTHER PUBLICATIONS

International Search Report issued in corresponding International Patent Application No. PCT/JP2019/022714, Jul. 30, 2019.
(Continued)

*Primary Examiner* — Gregory H Curran
(74) *Attorney, Agent, or Firm* — Merchant & Gould P.C.

(57) ABSTRACT

An image forming apparatus including a main body casing, a drum cartridge and a developing cartridge. The main body casing has an opening and a slot extending in from the opening toward an inside of the main body casing along a first direction. The drum cartridge and the developing cartridge are arranged in a second direction intersecting the first direction in a state where the drum cartridge and the developing cartridge are attached to the slot. The main body casing includes a drum guide groove configured to guide movement of the drum cartridge. The drum cartridge includes a drum protrusion configured to be engaged with the drum guide groove. A width of the drum guide groove in the second direction is decreased toward the inside of the main body casing from the opening.

12 Claims, 10 Drawing Sheets

Related U.S. Application Data continuation of application No. 17/179,784, filed on Feb. 19, 2021, now Pat. No. 11,467,512, which is a continuation of application No. 16/784,589, filed on Feb. 7, 2020, now Pat. No. 10,942,469.

(56) References Cited

U.S. PATENT DOCUMENTS

| | | | |
|---|---|---|---|
| 2008/0138106 | A1 | 6/2008 | Kanno et al. |
| 2008/0152386 | A1 | 6/2008 | Sakaguchi et al. |
| 2011/0280614 | A1 | 11/2011 | Yamauchi et al. |
| 2015/0139690 | A1 | 5/2015 | Kim et al. |
| 2017/0248906 | A1 | 8/2017 | Tanabe et al. |
| 2018/0120763 | A1 | 5/2018 | Takano et al. |
| 2018/0210393 | A1 | 7/2018 | Makiguchi et al. |
| 2018/0335751 | A1 | 11/2018 | Hale |

FOREIGN PATENT DOCUMENTS

| | | | |
|---|---|---|---|
| JP | 2007-3856 | A | 1/2007 |
| JP | 2011-237641 | A | 11/2011 |
| JP | 2013-57772 | A | 3/2013 |
| JP | 2016-133653 | A | 7/2016 |
| JP | 2017-173805 | A | 9/2017 |
| JP | 2018-77459 | A | 5/2018 |
| JP | 2018-136580 | A | 8/2018 |

OTHER PUBLICATIONS

Written Opinion issued in corresponding International Patent Application No. PCT/JP2019/022714, Jul. 30, 2019.
Office Action issued in corresponding Japanese Patent Application No. 2023-012931, Jan. 4, 2024.

IMAGE FORMING APPARATUS

CROSS-REFERENCE TO RELATED APPLICATION

This application is a continuation of U.S. patent application Ser. No. 17/930,108 filed Sep. 7, 2022, now U.S. Pat. No. 11,947,277, which is a continuation of U.S. patent application Ser. No. 17/179,784, filed Feb. 19, 2021, now U.S. Pat. No. 11,467,512, which is a continuation of U.S. patent application Ser. No. 16/784,589, filed Feb. 7, 2020, now U.S. Pat. No. 10,942,469, which claims priority from Japanese Patent Application No. 2019-035417 filed on Feb. 28, 2019. The content of the aforementioned applications is incorporated herein by reference in its entirety.

TECHNICAL FIELD

Aspects of the disclosure relate to an image forming apparatus including a drum cartridge and a developing cartridge, each of which is removably insertable to a main body casing of the image forming apparatus.

BACKGROUND

Some known image forming apparatus is configured such that a drum cartridge and a developing cartridge are individually insertable into and removable from a main body casing of the image forming apparatus. In such an image forming apparatus, the drum cartridge and the developing cartridge are insertable into and removable from the main body casing in an axial direction of a photosensitive drum, respectively. The main body casing has an opening and a slot. The opening allows the drum cartridge and the developing cartridge to be inserted into the main body casing. The slot is configured to receive the drum cartridge and the developing cartridge.

The slot includes a guide portion that guides movement of the drum cartridge during insertion and removal of the drum cartridge and another guide portion that guides movement of the developing cartridge during insertion and removal of the developing cartridge.

SUMMARY

According to the known image forming apparatus, the drum cartridge and the developing cartridge may be respectively inserted into the slot. Consequently, the known image forming apparatus may include guide portions more than an image forming apparatus having a configuration in which a process cartridge including a drum cartridge and a developing cartridge is inserted into a slot of a main body casing. This may cause each guide portion to have a relatively narrow width and/or the guide portions to be arranged at narrow intervals.

Such a configuration may thus cause difficulty in inserting the drum cartridge and the developing cartridge to the main body casing.

Accordingly, aspects of the disclosure provide an image forming apparatus including guide portions each having a relatively narrow width and having a configuration that may facilitate insertion of a drum cartridge to a main body casing of the image forming apparatus.

According to an illustrative embodiment of the present disclosure, there is provided an image forming apparatus including a main body casing, a drum cartridge and a developing cartridge. The main body casing has an opening and a slot extending in from the opening toward an inside of the main body casing along a first direction. The drum cartridge includes a photosensitive drum rotatable about a first axis extending in the first direction. The drum cartridge is removably insertable into the slot through the opening in the first direction. The developing cartridge includes a developing roller rotatable about a second axis extending in the first direction. The developing cartridge is removably insertable into the slot through the opening in the first direction. The drum cartridge and the developing cartridge are arranged in a second direction intersecting the first direction in a state where the drum cartridge and the developing cartridge are attached to the slot. The main body casing includes a drum guide groove configured to guide movement of the drum cartridge. The drum guide groove extends in the first direction. The drum cartridge includes a drum protrusion configured to be engaged with the drum guide groove. The drum protrusion extends in the first direction. A width of the drum guide groove in the second direction is decreased toward the inside of the main body casing from the opening.

DETAILED DESCRIPTION

An illustrative embodiment will be described with reference to the accompanying drawings. A description will be first provided on an overall configuration of a color printer 1 as an example of an image forming apparatus.

Figure 1:
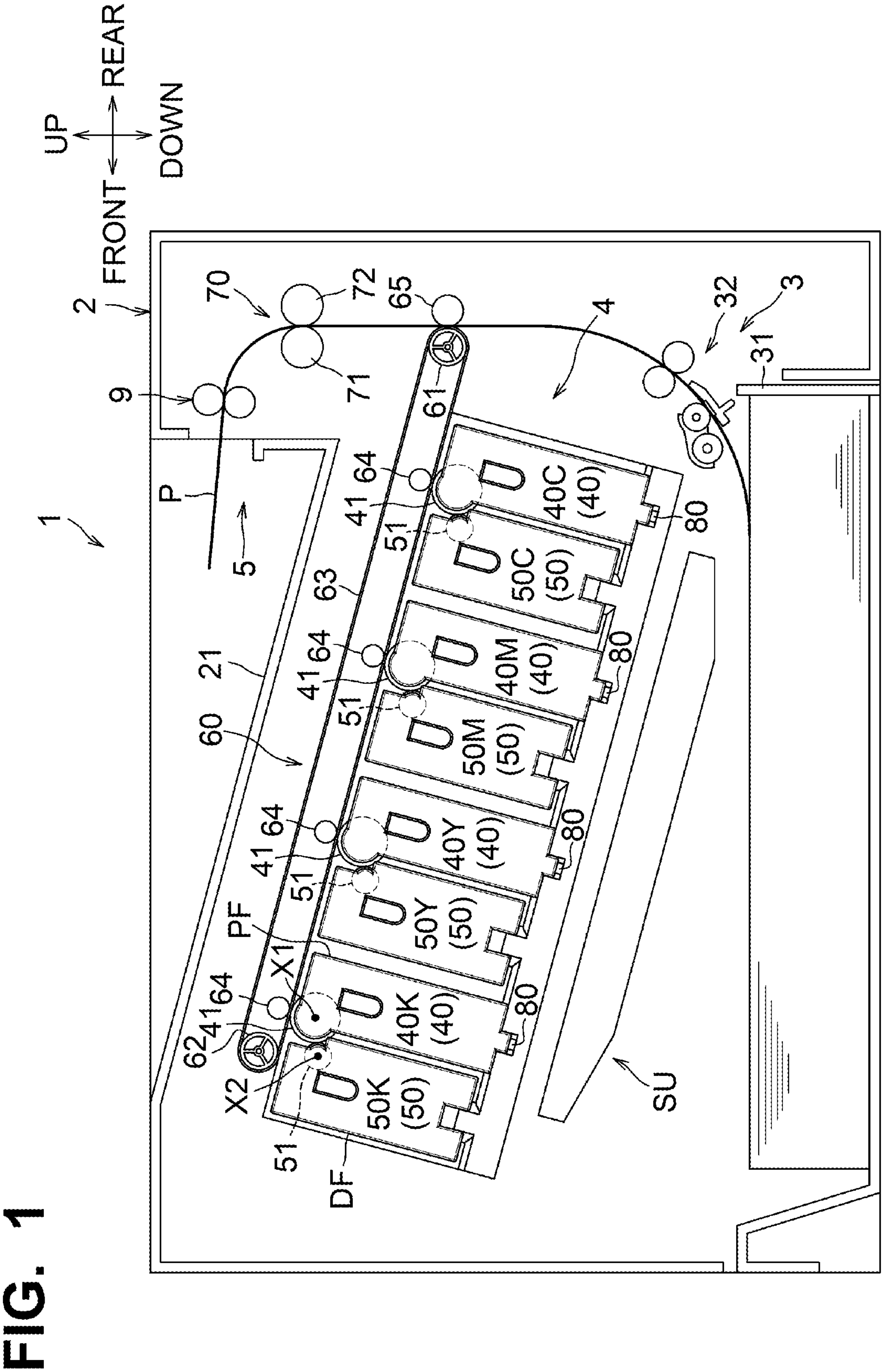
FIG. 1 is a sectional view illustrating a general configuration of a color printer according to an illustrative embodiment of the disclosure.

In the following description, a description will be provided with reference to directions as shown in the drawing of FIG. 1. That is, left and right sides of the page of FIG. 1, a side facing out of the page, and a side facing into the page are defined respectively as front, rear, right, and left sides of the color printer 1. Upper and lower side of the page of FIG. 1 are defined respectively as upper and lower sides of the color printer 1.

As illustrated in FIG. 1, the color printer 1 includes a main body casing 2, a feed unit 3, an image forming unit 4, and a discharge unit 5. The feed unit 3 is configured to feed a sheet S to the image forming unit 4. The image forming unit 4 is configured to form an image onto a sheet S. The discharge unit 5 is configured to discharge a sheet S to the outside of the main body casing 2.

The feed unit 3 is positioned in a lower portion of the main body casing 2. The feed unit 3 includes a feed tray 31 and a feed mechanism 32. The feed tray 31 is insertable into and removable from the main body casing 2. The feed mechanism 32 is configured to feed a sheet S from the feed tray 31 to the image forming unit 4.

The image forming unit 4 includes a plurality of, for example, four drum cartridges 40, a plurality of, for example, four developing cartridges 50, an exposure device SU, a transfer unit 60, and a fixing unit 70.

In the image forming unit 4, the drum cartridges 40, the developing cartridges 50, the exposure device SU, and the transfer unit 60 are each downwardly inclined toward the rear of the main body casing 2.

Each drum cartridge 40 includes a photosensitive drum 41, a charger, and a drum frame PF. The photosensitive drum 41 is rotatable about a first axis X1 extending in a first direction. In a state where the drum cartridges 40 are attached to the main body casing 2, the drum cartridges 40 are next to each other in a second direction perpendicular to the first direction.

In the illustrative embodiment, for example, the image forming unit 4 includes four drum cartridges 40. The drum cartridges 40 correspond to respective toner colors such as black K, yellow Y, magenta M, and cyan C. The drum cartridges 40 include a drum cartridge 40 for black K, a drum cartridge 40 for yellow Y, a drum cartridge 40 for magenta M, and a drum cartridge 40 for cyan C that are arranged in this order from upstream to downstream (e.g., from front to rear of the color printer 1) in a direction in which a circumferential surface of an intermediate transfer belt 63 contactable to each photosensitive drum 41 moves.

In the description below and the accompanying drawings, when the drum cartridges 40 are distinguished by toner color, specific letters K, Y, M, and C representing respective toner colors are appended to the reference numeral 40. Otherwise, the specific letters Y, M, C, and K are omitted. In the description below, the drum cartridges 40 have the same or similar configuration and function in the same or similar manner to each other. Therefore, one of the drum cartridges 40 may be described in detail, and a description for the others may be omitted.

Each developing cartridge 50 includes a developing roller 51 and a developing frame DF. The developing frame DF stores toner as a developer. The developing roller 51 is rotatable about a second axis X2 extending in the first direction. In a state where the developing cartridges 50 are attached to the main body casing 2, the developing cartridges 50 are next to each other in the second direction perpendicular to the first direction.

In a state where the drum cartridges 40 and the developing cartridges 50 are attached to the main body casing 2, the drum cartridges 40 and the developing cartridges 50 are alternately arranged in the second direction.

In the illustrative embodiment, for example, the image forming unit 4 includes four developing cartridges 50. The developing cartridges 50 correspond to the respective toner colors such as black K, yellow Y, magenta M, and cyan C. The developing cartridges 50 include a developing cartridge 50 for black K, a developing cartridge 50 for yellow Y, a developing cartridge 50 for magenta M, and a developing cartridge 50 for cyan C that are arranged in this order from upstream to downstream (e.g., from front to rear of the color printer 1) in the direction in which the circumferential surface of the intermediate transfer belt 63 contactable to each photosensitive drum 41 moves.

In the description below and the accompanying drawings, when the developing cartridges 50 are distinguished by toner color, specific letters K, Y, M, and C representing respective toner colors are appended to the reference numeral 50. Otherwise, the specific letters Y, M, C, and K are omitted. In the description below, the developing cartridges 50 have the same or similar configuration and function in the same or similar manner to each other. Therefore, one of the developing cartridges 50 may be described in detail, and a description for the others may be omitted.

The exposure device SU is positioned below the drum cartridges 40. The exposure device SU is configured to irradiate a circumferential surface of each photosensitive drum 41 with a laser beam.

The transfer unit 60 is positioned between the photosensitive drums 41 and a discharge tray 21 in the up-down direction. The transfer unit 60 includes a drive roller 61, a driven roller 62, the intermediate transfer belt 63, a plurality of, for example, four, first transfer rollers 64, and a second transfer roller 65.

The intermediate transfer belt 63 may be an endless belt. In a state where the drum cartridges 40 and the developing cartridges 50 are attached to the main body casing 2, the intermediate transfer belt 63 is positioned above the drum cartridges 40 and the developing cartridges 50.

The first transfer rollers 64 are positioned inside the loop of the intermediate transfer belt 63. The first transfer rollers 64 and the respective corresponding photosensitive drums 41 sandwich the intermediate transfer belt 63 therebetween.

The second transfer roller 65 is positioned outside the loop of the intermediate transfer belt 63. The second transfer roller 65 and the drive roller 61 sandwich the intermediate transfer belt 63 therebetween.

The fixing unit 70 is positioned above the intermediate transfer belt 63. The fixing unit 70 includes a heat roller 71 and a pressure roller 72. The pressure roller 72 is configured to be pressed toward the heat roller 71.

The discharge unit 5 is positioned in an upper portion of the main body casing 2. The discharge unit 5 is positioned above the intermediate transfer belt 63. The discharge unit 5 includes discharge rollers 9 and the discharge tray 21. The discharge rollers 9 are configured to convey a sheet S toward the discharge tray 21.

In the color printer 1, first, the charger charges the circumferential surface of each photosensitive drum 41. Thereafter, the exposure device SU exposes the circumferential surface of each photosensitive drum 41. Thus, an electrostatic latent image is formed on the circumferential surface of each photosensitive drum 41.

After that, each developing roller 51 supplies developer onto the electrostatic latent image formed on a corresponding photosensitive drum 41, thereby forming a developer image on the circumferential surface of each photosensitive drum 41. Each first transfer roller 64 then transfers the developer image onto an outer circumferential surface of the intermediate transfer belt 63 from the circumferential surface of the corresponding photosensitive drum 41.

When a sheet S passes between the intermediate transfer belt 63 and the second transfer roller 65, the second transfer roller 65 transfers the overlapping developer images onto the sheet S from the outer circumferential surface of the intermediate transfer belt 63. Thereafter, the fixing unit 70 fixes the transferred developer images onto the sheet S. The discharge rollers 9 then convey the sheet S to discharge the sheet S to the discharge tray 21.

Figure 2:
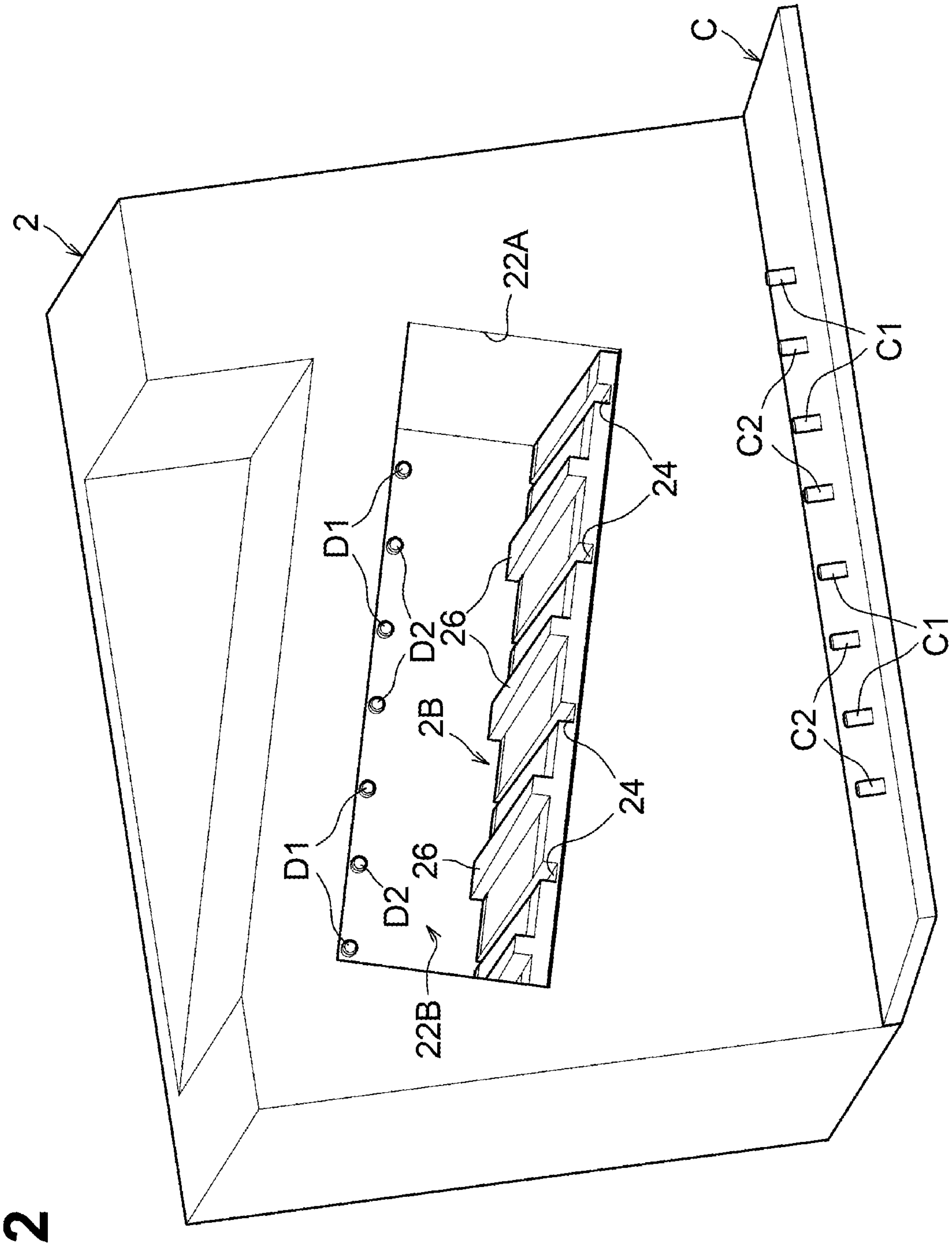
FIG. 2 is a perspective view of a main body casing of the image forming apparatus with a cover opened, wherein a slot is devoid of drum cartridges and developing cartridges.

As illustrated in FIG. 2, the main body casing 2 includes an opening 22A, a slot 22B, and a cover C.

The opening 22A allows each drum cartridge 40 and each developing cartridge 50 to pass therethrough during their insertion or removal.

The slot 22B extends from the opening 22A toward the inside of the main body casing 2 along the first direction. The slot 22B is configured to accommodate four drum cartridges 40 and four developing cartridges 50.

The cover C is configured to cover and uncover the opening 22A. The cover C is pivotable on its lower end. The cover C is movable between an open position at which the cover C covers the opening 22A (e.g., the position of the cover C illustrated in FIG. 2) and a closed position at which the cover C uncovers the opening 22A.

The cover C includes first protrusions C1 and second protrusions C2. Each first protrusion C1 is engageable with a drum elongated hole 43 of a corresponding drum cartridge 40. Each second protrusion C2 is engageable with a developing elongated hole 53 of a corresponding developing cartridge 50.

The main body casing 2 further includes first protrusions D1 and second protrusions D2 at an inner surface of a sidewall 2A thereof. Each first protrusion D1 is engageable with a drum elongated hole 43 of a corresponding drum cartridge 40. Each second protrusion D2 is engageable with a developing elongated hole 53 of a corresponding developing cartridge 50. When the cover C is located at the closed position, the sidewall 2A is spaced from the cover C in the first direction.

When the cover C is located at the closed position, the first protrusions D1 and the second protrusions D2 of the sidewall 2A face the first protrusions C1 and the second protrusions C2, respectively, of the cover C in the first direction.

The main body casing 2 further includes a cartridge guide portion 2B at the bottom of the slot 22B.

The cartridge guide portion 2B includes drum guide grooves 24 and developing guide protrusions 26. The drum guide grooves 24 and the developing guide protrusions 26 are positioned in or at an upper surface of the cartridge guide portion 2B. All of the drum guide grooves 24 may have the same configuration. All of the developing guide protrusions 26 may have the same configuration. Therefore, one of the drum guide grooves 24 and one of the developing guide protrusions 26 will be described in detail, and a description for the others will be omitted. In the description below, other plural same components may have the same or similar configuration and function in the same or similar manner to each other. Therefore, one of the plural same components will be described in detail, and a description for the others will be omitted. Four each of the drum guide groove 24 and the developing guide protrusion 26 are arranged in the second direction (refer to FIG. 5).

The cartridge guide portion 2B has slits that each penetrate therethrough to allow a laser beam emitted by the exposure device SU to pass therethrough.

Figure 5:
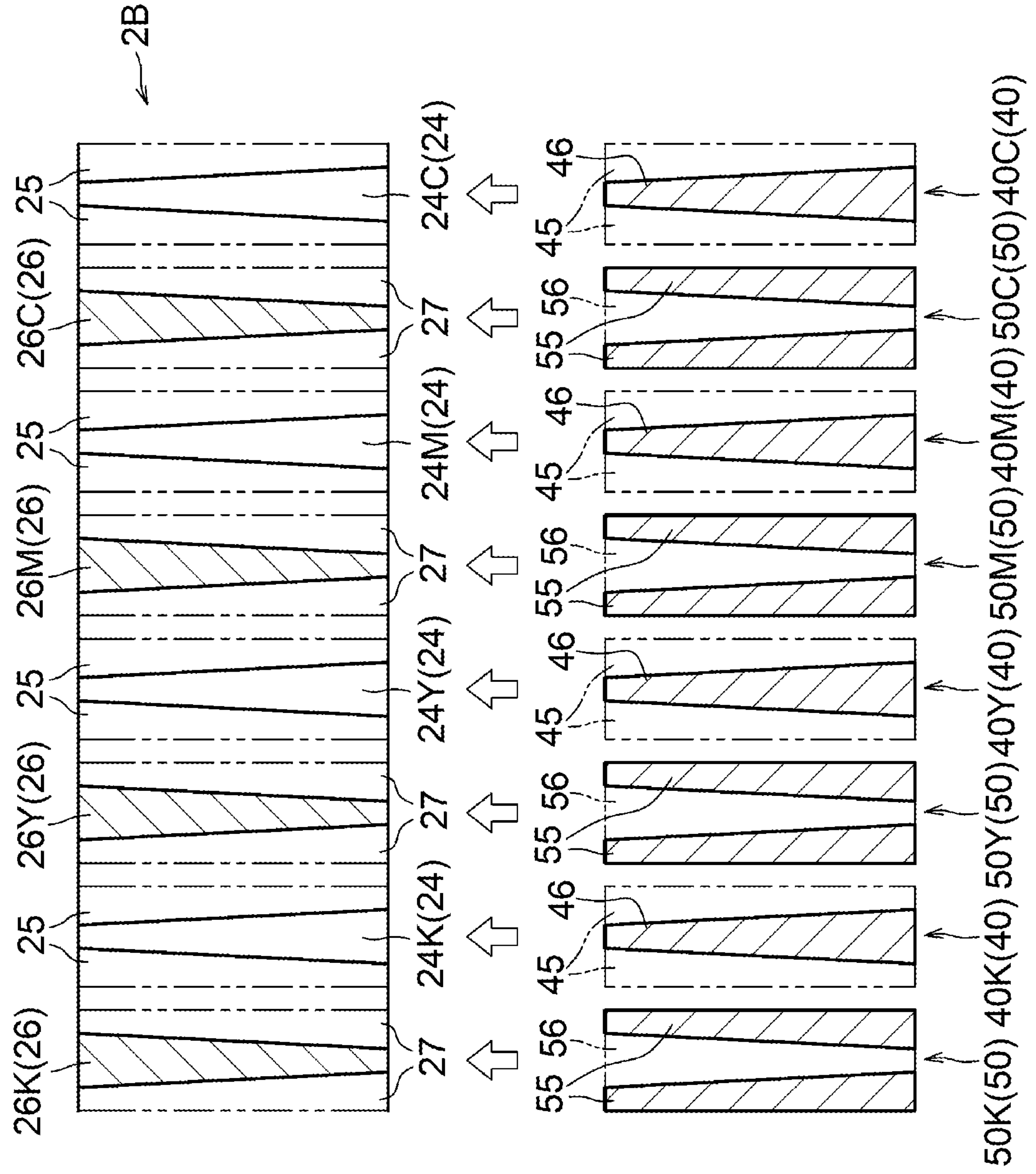
FIG. 5 is an explanatory diagram for explaining a relationship between a drum guide groove of the slot and a drum protrusion of a corresponding drum cartridge and a relationship between a developing guide protrusion of the slot and a developing groove of a corresponding developing cartridge.

As illustrated in FIG. 5, a drum guide groove 24 extends in the first direction. The drum guide groove 24 is configured to guide movement of a corresponding drum cartridge 40. The drum guide groove 24 has a width in the second direction. The width of the drum guide groove 24 is decreased toward the sidewall 2A (i.e., the inside of the main body casing 2) from the opening 22A. More specifically, for example, the drum guide groove 24 is tapered such that opposite side surfaces of the drum guide groove 24 are continuously inclined relative to the first direction in mirror image. The drum guide grooves 24 include drum guide grooves 24K, 24Y, 24M, and 24C, all of which may have the same configuration.

A developing guide protrusion 26 extends in the first direction. The developing guide protrusion 26 is configured to guide movement of a corresponding developing cartridge 50. The developing guide protrusion 26 has a width in the second direction. The width of the developing guide protrusion 26 is increased toward the sidewall 2A (i.e., the inside of the main body casing 2) from the opening 22A. More specifically, for example, the developing guide protrusion 26 is tapered such that opposite side surfaces of the developing guide protrusion 26 are continuously inclined relative to the first direction in mirror image. The developing guide protrusions 26 include developing guide protrusions 26K, 26Y, 26M, and 26C, all of which may have the same configuration.

As illustrated in FIG. 2, the upper surface of the cartridge guide portion 2B is inclined toward the intermediate transfer belt 63 as the upper surface of the cartridge guide portion 2B extends toward the sidewall 2A (i.e., the inside of the main body casing 2) from the opening 22A.

As illustrated in FIG. 5, the upper surface of the cartridge guide portion 2B further includes drum guide surfaces 25 and developing guide surfaces 27. All of the drum guide surfaces 25 may have the same configuration. All of the developing guide surfaces 27 may have the same configuration.

A drum guide surface 25 occupies both sides of a drum guide groove 24. The drum guide surface 25 is configured to guide movement of a corresponding drum cartridge 40. The drum guide surface 25 is positioned next to the drum guide surface 24 in the second direction.

As described above, the upper surface of the cartridge guide portion 2B is inclined toward the intermediate transfer belt 63. Thus, the drum guide surface 25 is inclined toward the intermediate transfer belt 63 as the drum guide surface 25 extends toward the inside of the main body casing 2 (i.e., the sidewall 2A) from the opening 22A.

A developing guide surface 27 occupies both sides of a developing guide protrusion 26. The developing guide surface 27 is configured to guide movement of a corresponding developing cartridge 50. The developing guide surface 27 is positioned next to the developing guide protrusion 26 in the second direction.

As described above, the upper surface of the cartridge guide portion 2B is inclined toward the intermediate transfer belt 63. Thus, the developing guide surface 27 is inclined toward the intermediate transfer belt 63 as the developing guide surface 27 extends toward the inside of the main body casing 2 (i.e., the sidewall 2A) from the opening 22A.

Figure 6:
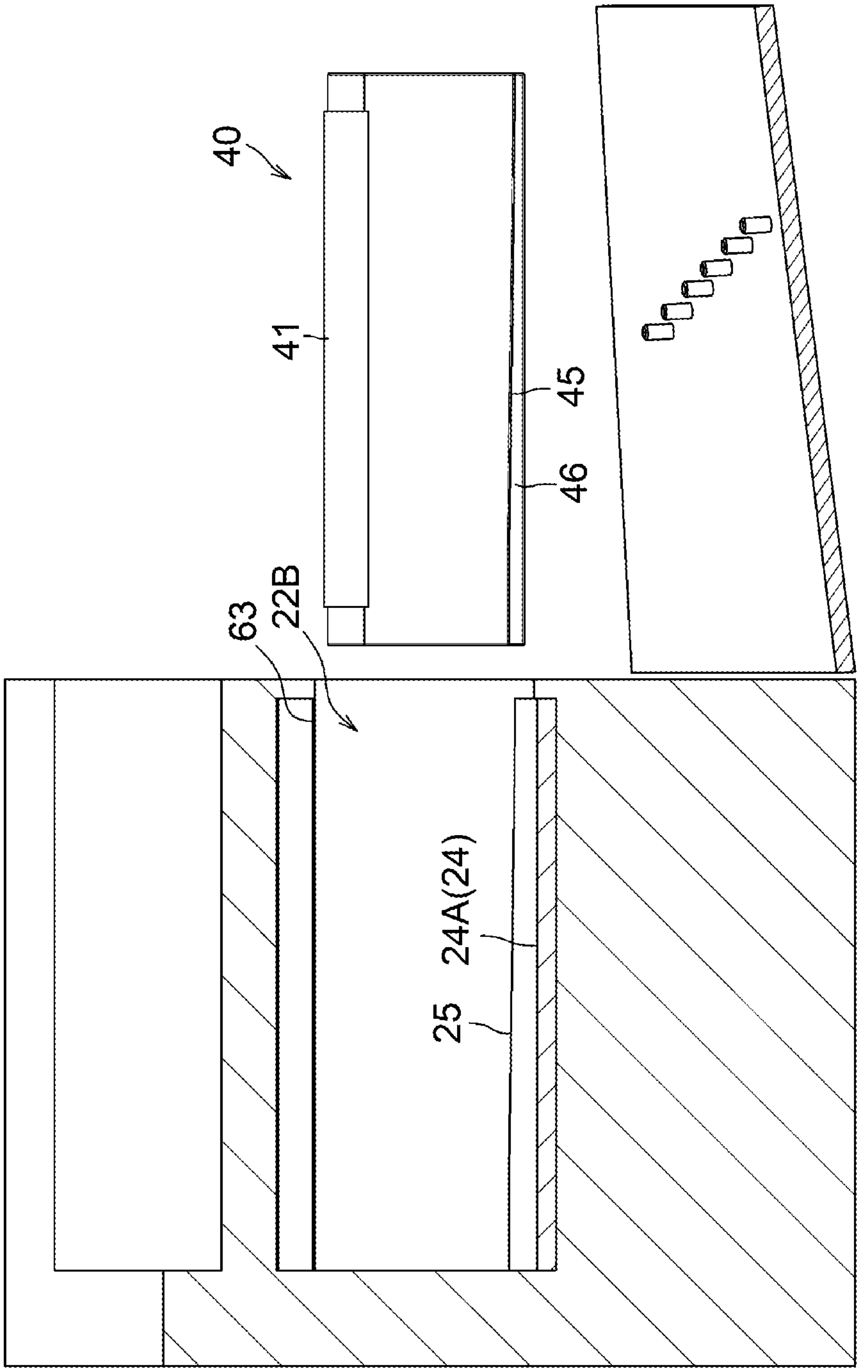
FIG. 6 is an explanatory diagram for explaining a situation in which a drum cartridge is inserted into the slot of the main body casing.

As illustrated in FIG. 6, the drum guide groove 24 has a bottom surface 24A that extends parallel to a lower outer circumferential surface of the intermediate transfer belt 63. The drum guide surface 25 is inclined relative to the lower outer circumferential surface of the intermediate transfer belt 63.

Figure 7:
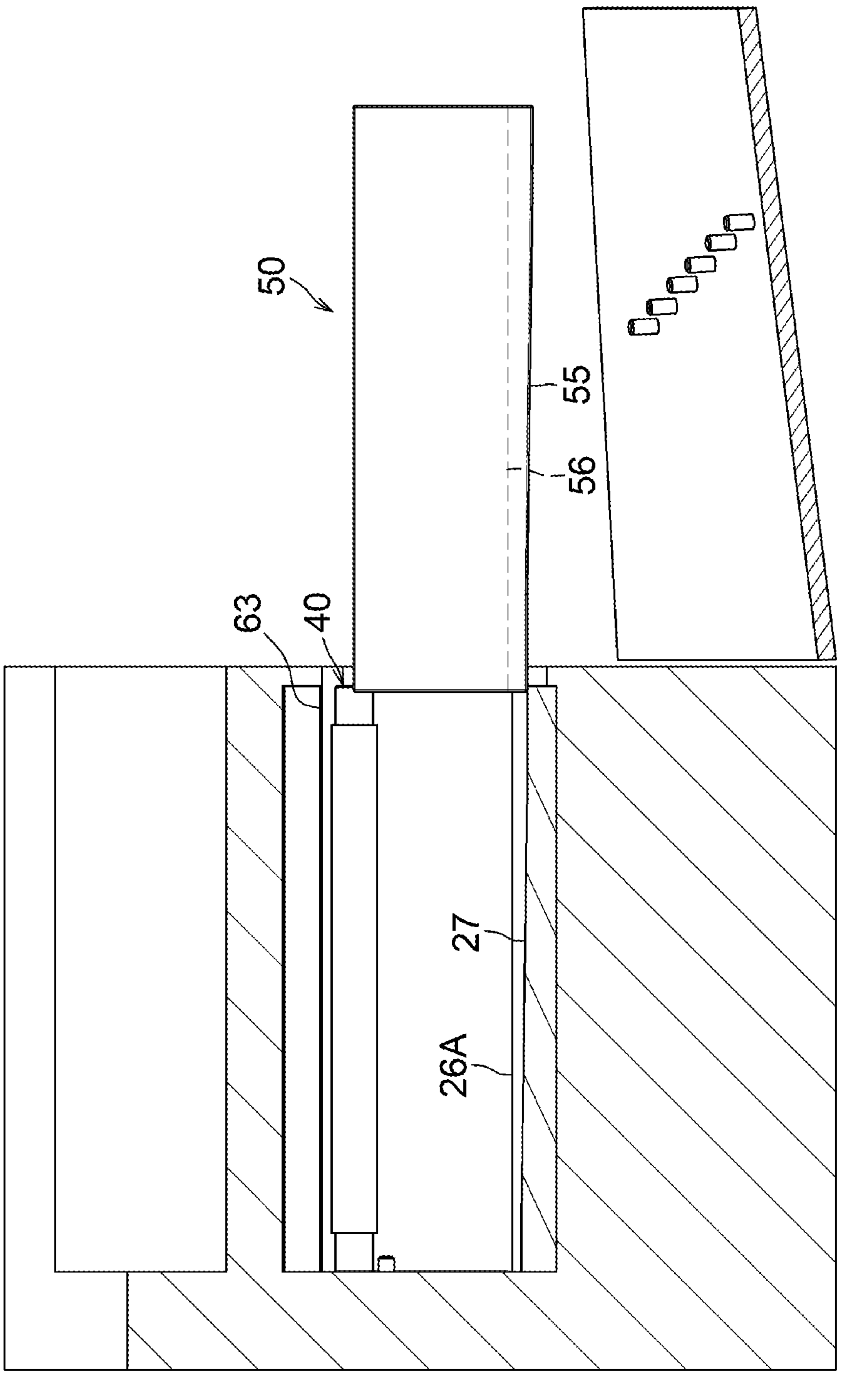
FIG. 7 is an explanatory diagram for explaining a situation in which a developing cartridge is inserted into the slot of the main body casing.

As illustrated in FIG. 7, the developing guide protrusion 26 has an upper surface 26A that extends parallel to the lower outer circumferential surface of the intermediate transfer belt 63. The developing guide surface 27 is inclined relative to the lower outer circumferential surface of the intermediate transfer belt 63.

The drum cartridges 40 and the developing cartridges 50 are individually insertable into and removable from the main body casing 2 in the first direction.

More specifically, for example, each drum cartridge 40 is insertable into the slot 22B in the first direction through the opening 22A. Likewise, each developing cartridge 50 is insertable into the slot 22B in the first direction through the opening 22A.

All of the drum cartridges 40 may have the same configuration. All of the developing cartridges 50 may have the same configuration.

Figure 3A:
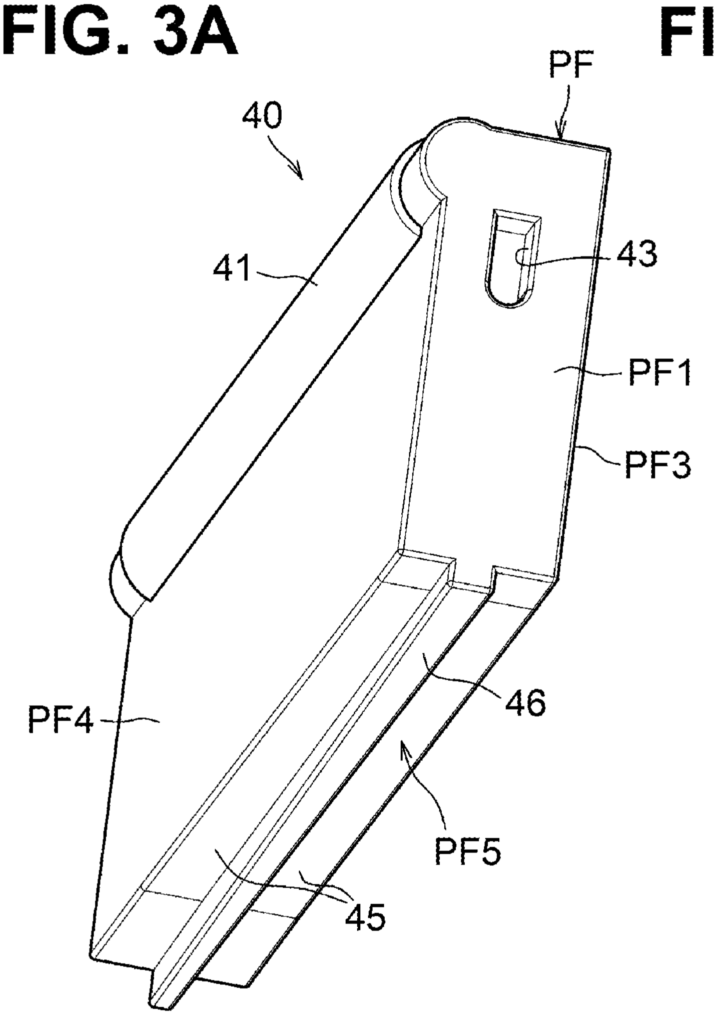
FIG. 3A is a perspective view of one of the drum cartridges.
Figure 3C:
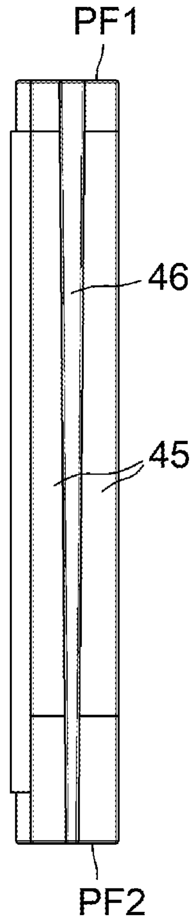
FIG. 3C is a bottom view of the drum cartridge.
Figure 3B:
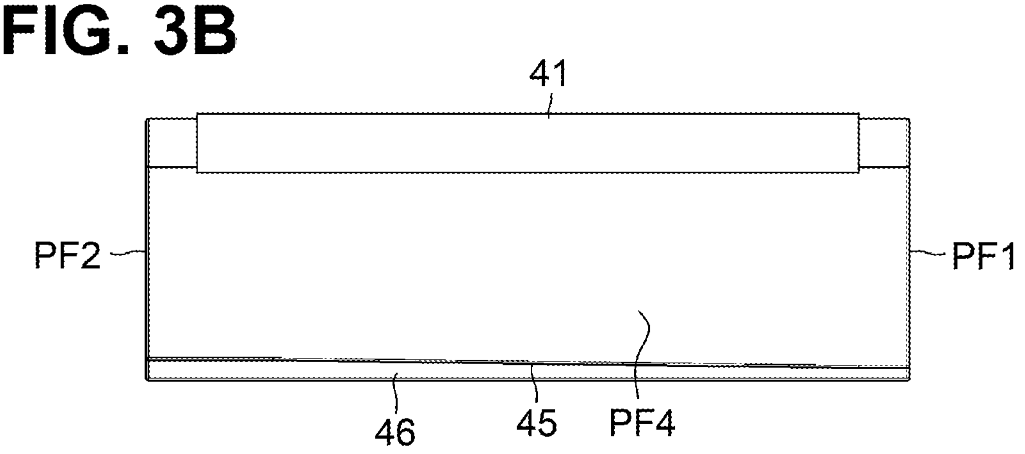
FIG. 3B is a front view of the drum cartridge.

As illustrated in FIGS. 3A, 3B, and 3C, the drum frame PF of the drum cartridge 40 includes a first drum sidewall PF1, a second drum sidewall PF2, a third drum sidewall PF3, a fourth drum sidewall PF4, and a fifth drum sidewall PF5. In a state where the drum cartridge 40 is attached to the slot 22B, the first drum sidewall PF1 and the second drum sidewall PF2 face each other in the first direction and the third drum sidewall PF3 and the fourth drum sidewall PF4 face each other in the second direction. The fifth drum sidewall PF5 includes a bottom surface of the drum frame PF.

The first drum sidewall PF1 is positioned closer to the opening 22A than the second drum sidewall PF2 to the opening 22A in a state where the drum cartridge 40 is attached to the slot 22B. The first drum sidewall PF1 has a drum elongated hole 43 engageable with a corresponding first protrusion C1 of the cover C in a state where the cover C is located at the closed position.

The second drum sidewall PF2 is positioned farther from the opening 22A than the first drum sidewall PF1 from the opening 22A in a state where the drum cartridge 40 is attached to the main body casing 2. The second drum sidewall PF2 has a drum elongated hole engageable with a corresponding first protrusion D1 of the main body casing 2. The drum elongated hole of the second drum sidewall PF2 may have the same shape as the drum elongated hole 43 of the first drum sidewall PF1.

The first drum sidewall PF1 and the second drum sidewall PF2 support the photosensitive drum 41 such that the photosensitive drum 41 is rotatable.

The third drum sidewall PF3 and the fourth drum sidewall PF4 each connect between the first drum sidewall PF1 and the second drum sidewall PF2.

The fifth drum sidewall PF5 connects between the first drum sidewall PF1, the second drum sidewall PF2, the third drum sidewall PF3, and the fourth drum sidewall PF4.

The fifth drum sidewall PF5 has a drum contactable surface 45 contactable to a corresponding drum guide surface 25 of the cartridge guide portion 2B in a state where the drum cartridge 40 is attached to the slot 22B. More specifically, for example, in a state where the drum cartridge 40 is attached to the slot 22B, the drum contactable surface 45 is inclined toward the intermediate transfer belt 63 as the drum contactable surface 45 extends toward the inside of the main body casing 2 (i.e., the sidewall 2A) from the opening 22A (refer to FIG. 6). The drum contactable surface 45 is inclined relative to the first axis X1 of the photosensitive drum 41. The inclination angle of the drum contactable surface 45 is equal to the inclination angle of the corresponding drum guide surface 25 relative to the lower outer circumferential surface of the intermediate transfer belt 63. With this configuration, in a state where the drum cartridge 40 is attached to the slot 22B, the drum guide surface 25 and the drum contactable surface 45 contact to each other, thereby enabling the photosensitive drum 41 and the intermediate transfer belt 63 to extend parallel to each other.

The fifth drum sidewall PF5 further includes a drum protrusion 46 protruding from the drum contactable surface 45. The drum protrusion 46 extends in the first direction. The drum protrusion 46 is configured to be engaged with a corresponding drum guide groove 24. More specifically, for example, the drum protrusion 46 has a width in the second direction. In a state where the drum cartridge 40 is attached to the slot 22B, the width of the drum protrusion 46 is decreased as the drum protrusion 46 extends toward the inside of the main body casing 2 (i.e., the sidewall 2A) from the opening 22A. More specifically, for example, the drum protrusion 46 is tapered such that opposite side surfaces of the drum protrusion 46 are continuously inclined relative to the first direction in mirror image. The side surfaces of the drum protrusion 46 may contact respective sidewalls of a corresponding drum guide groove 24 in a state where the drum cartridge 40 is attached to the slot 22B.

As illustrated in FIG. 3B, while a lower surface of the drum protrusion 46 extends parallel to the first axis X1 of the photosensitive drum 41, the drum contactable surface 45 is inclined relative to the first axis X1 of the photosensitive drum 41. More specifically, for example, in a state where the drum cartridge 40 is attached to the slot 22B, the drum contactable surface 45 is inclined upward as the drum contact surface 45 extends toward the inside of the main body casing 2 (i.e., the sidewall 2A) from the opening 22A.

Figure 4A:
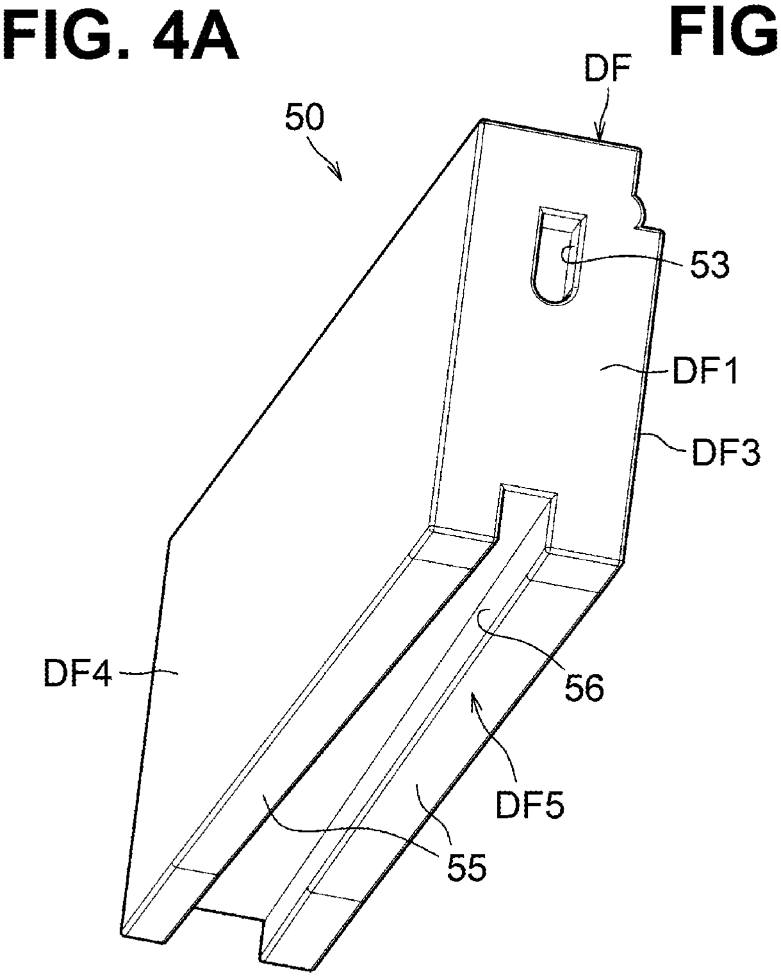
FIG. 4A is a perspective view of one of the developing cartridges.
Figure 4C:
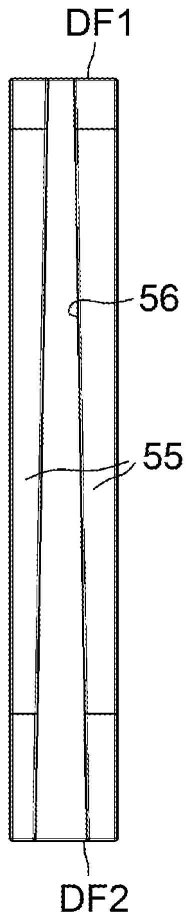
FIG. 4C is a bottom view of the developing cartridge.
Figure 4B:
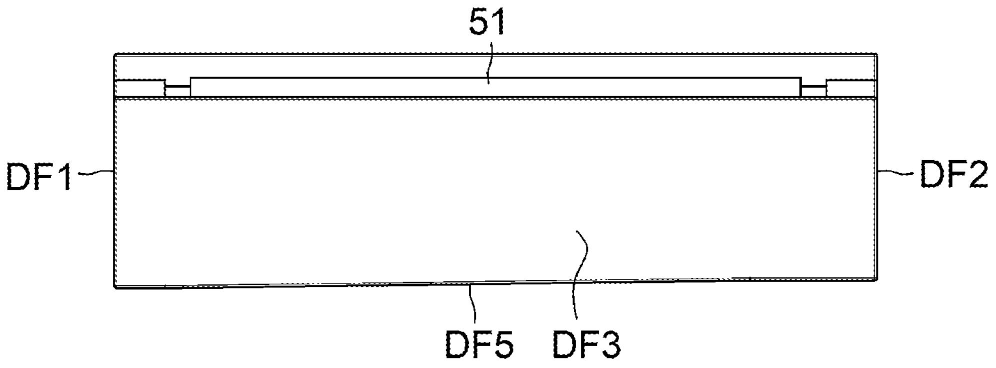
FIG. 4B is a front view of the developing cartridge.

As illustrated in FIGS. 4A, 4B, and 4C, the developing cartridge DF of the developing cartridge 50 includes a first developing sidewall DF1, a second developing sidewall DF2, a third developing sidewall DF3, a fourth developing sidewall DF4, and a fifth developing sidewall DF5. In a state where the developing cartridge 50 is attached to the slot 22B, the first developing sidewall DF1 and the second developing sidewall DF2 face each other in the first direction and the third developing sidewall DF3 and the fourth developing sidewall DF4 face each other in the second direction. The fifth developing sidewall DF5 includes a bottom surface of the developing cartridge DF.

The first developing sidewall DF1 is positioned closer to the opening 22A than the second developing sidewall DF2 to the opening 22A in a state where the developing cartridge 50 is attached to the slot 22B. The first developing sidewall DF1 has a developing elongated hole 53 engageable with a corresponding second protrusion C2 of the cover C in a state where the cover C is located at the closed position.

The second developing sidewall DF2 is positioned farther from the opening 22A than the first developing sidewall DF1 from the opening 22A in a state where the developing cartridge 50 is attached to the slot 22B. The second developing sidewall DF2 has a developing elongated hole engageable with a corresponding second protrusion D2 of the main body casing 2. The developing elongated hole of the second developing sidewall DF2 may have the same shape as the developing elongated hole 53 of the first developing sidewall DF1.

The first developing sidewall DF1 and the second developing sidewall DF2 support the developing roller 51 such that the developing roller 51 is rotatable.

The third developing sidewall DF3 and the fourth developing sidewall DF4 each connect between the first developing sidewall DF1 and the second developing sidewall DF2.

The fifth developing sidewall DF5 connects between the first developing sidewall DF1, the second developing sidewall DF2, the third developing sidewall DF3, and the fourth developing sidewall DF4.

The fifth developing sidewall DF5 has a developing contactable surface 55 contactable to a corresponding developing guide surface 27 of the cartridge guide portion 2B in a state where the developing cartridge 50 is attached to the slot 22B. More specifically, for example, in a state where the developing cartridge 50 is attached to the main body casing 2, the developing contactable surface 55 is inclined toward the intermediate transfer belt 63 as the developing contactable surface 55 extends toward the inside of the main body casing 2 (i.e., the sidewall 2A) from the opening 22A (refer to FIG. 7). The developing contactable surface 55 is inclined relative to the second axis X2 of the developing roller 51. The inclination angle of the developing contactable surface 55 is equal to the inclination angle of the developing guide surface 27 relative to the lower outer circumferential surface of the intermediate transfer belt 63. With this configuration, in a state where the developing cartridge 50 is attached to the slot 22B, the developing guide surface 27 and the developing contactable surface 55 contact to each other, thereby enabling the developing roller 51 and the intermediate transfer belt 63 to extend parallel to each other.

The first developing sidewall DF5 further includes a developing groove 56 in the developing contactable surface 55. In a state where the developing cartridge 50 is attached to the slot 22B, the developing groove 56 extends in the first direction and may be engaged with a corresponding developing guide protrusion 26. More specifically, for example, the developing groove 56 has a width in the second direction. In a state where the developing cartridge 50 is attached to the slot 22B, the width of the developing groove 56 is increased as the developing groove 56 extends toward the inside of the main body casing 2 (i.e., the sidewall 2A) from the opening 22A. More specifically, for example, the developing groove 56 is tapered such that opposite side surfaces of the developing groove 56 are continuously inclined relative to the first direction in mirror image. The side surfaces of the developing groove 56 may contact respective sidewalls of a corresponding developing guide protrusion 26 in a state where the developing cartridge 50 is attached to the slot 22B.

As illustrated in FIG. 4B, while a bottom surface of the developing groove 56 extends parallel to the second axis X2 of the developing roller 51, the developing contactable surface 55 is inclined relative to the second axis X2 of the developing roller 51. More specifically, for example, in a state where the developing cartridge 50 is attached to the slot 22B, the developing contactable surface 55 is inclined upward as the developing contact surface 55 extends toward the inside of the main body casing 2 (i.e., the sidewall 2A) from the opening 22A.

Hereinafter, referring to FIGS. 6 and 7, a description will be provided on a procedure for inserting one of the drum cartridges 40 and one of the developing cartridges 50 into the slot 22B of the main body casing 2, and the description may also apply to the others.

As illustrated in FIGS. 2 and 6, for inserting a drum cartridge 40 into the slot 22B, the opening 22A and the slot 22B are exposed by movement of the cover C to the open position. A leading end of the drum protrusion 46 of the drum cartridge 40 is engaged with a corresponding drum guide groove 24 of the cartridge guide portion 2B and then the drum cartridge 40 is inserted into the main body casing 2 along the first direction to be attached thereto. An end of the drum guide groove 24 on the opening 22A side has a width wider than the width of the leading end of the drum protrusion 46, thereby facilitating insertion of the drum cartridge 40 into the slot 22B.

In response to the leading end of the drum protrusion 46 being engaged with the drum guide groove 24, the drum contactable surface 45 contacts the drum guide surface 25. As the drum cartridge 40 is inserted into the slot 22B along the first direction, the leading end of the drum protrusion 46 is guided by the drum guide groove 24 whose width is gradually decreased, thereby enabling the drum cartridge 40 to be attached in a proper position in the main body casing 2.

With such a configuration, inserting the drum cartridge 40 into the main body casing 2 with the second drum sidewall PF2 facing the opening 22A or the sidewall 2A allows the narrowest end of the drum protrusion 46 to be engaged with the drum guide groove 24 first and the widest end of the drum protrusion 46 to be engaged with the drum guide groove 24 last. The drum guide groove 24 engageable with the drum protrusion 46 has the widest end on the opening 22A side and the narrowest end on the sidewall 2A side. Such shapes of the drum guide groove 24 and the drum protrusion 46 may allow a large size difference at the entrance (i.e., the opening 22A), thereby facilitating insertion of the drum cartridge 40 into the main body casing 2.

A distance between the drum guide surface 25 and the lower outer circumferential surface of the intermediate transfer belt 63 at the entrance (e.g., on the opening 22A side) is greater than a distance between the drum guide surface 25 and the lower outer circumferential surface of the intermediate transfer belt 63 on the sidewall 2A side. Such a configuration may thus reduce or prevent damage to the circumferential surface of the photosensitive drum 41 due to contact of the photosensitive drum 41 and the intermediate transfer belt 63 during insertion of the drum cartridge 40. That is, in the insertion of the drum cartridge 40 into the slot 22B, the drum cartridge 40 may be inserted into the slot 22B from the position where the drum cartridge 40 is less susceptible to contact the intermediate transfer belt 63.

As illustrated in FIGS. 2 and 7, for inserting a developing cartridge 50 into the slot 22B, the opening 22A and the slot 22B are exposed by movement of the cover C to the open position. A leading end of the developing groove 56 of the developing cartridge 50 is engaged with a corresponding developing guide protrusion 26 of the cartridge guide portion 2B and then the developing cartridge 50 is inserted into the main body casing 2 along the first direction to be attached thereto. An end of the developing guide protrusion 26 on the opening 22A side has a width narrower than the width of the leading end of the developing groove 56, thereby facilitating insertion of the developing cartridge 50 to the slot 22B.

In response to the leading end of the developing groove 56 being engaged with the developing guide protrusion 26, the developing contactable surface 55 contacts the developing guide surface 27. As the developing cartridge 50 is inserted into the slot 22B along the first direction, the leading end of the developing groove 56 is guided by the developing guide protrusion 26 whose width is gradually increased, thereby enabling the developing cartridge 50 to be attached in a proper position in the main body casing 2.

With such a configuration, inserting the developing cartridge 50 into the main body casing 2 with the second developing sidewall DF2 facing the opening 22A or the sidewall 2A allows the widest end of the developing groove 56 to be engaged with the developing guide protrusion 26 first and the narrowest end of the developing groove 56 to be engaged with the developing guide protrusion 26 last. The developing guide protrusion 26 engageable with the developing groove 56 has the narrowest end on the opening 22A side and the widest end on the sidewall 2A side. Such shapes of the developing groove 56 and the developing guide protrusion 26 may allow a large size difference at the entrance (i.e., the opening 22A), thereby facilitating insertion of the developing cartridge 50 into the main body casing 2.

A distance between the developing guide surface 27 and the lower outer circumferential surface of the intermediate transfer belt 63 at the entrance (e.g., on the opening 22A side) is greater than a distance between the developing guide surface 27 and the lower outer circumferential surface of the intermediate transfer belt 63 on the sidewall 2A side. Such a configuration may thus reduce or prevent damage to the circumferential surface of the developing roller 51 due to contact of the developing roller 51 and the intermediate transfer belt 63 during insertion of the developing cartridge 50. That is, in the insertion of the developing cartridge 50 into the slot 22B, the developing cartridge 50 may be inserted into the slot 22B from the position where the developing cartridge 50 is less susceptible to contact the intermediate transfer belt 63.

In response to the drum cartridge 40 is attached to the slot 22B, a corresponding first protrusion D1 of the sidewall 2A of the main body casing 2 is engaged with the drum elongated hole of the second drum sidewall PF2 of the drum cartridge 40.

In response to the developing cartridge 50 is attached to the slot 22B, a corresponding second protrusion D2 of the sidewall 2A of the main body casing 2 is engaged with the developing elongated hole of the second developing sidewall DF2 of the developing cartridge 50.

In response to the cover C being located at the closed position, a corresponding first protrusion C1 of the cover C is engaged with the drum elongated hole 43 of the first drum sidewall PF1 of the drum cartridge 40 and a corresponding second protrusion C2 of the cover C is engaged with the developing elongated hole 53 of the first developing sidewall DF1 of the developing cartridge 50.

In such a state, in response to a drum pressing member 80 (refer to FIG. 1) being moved upward, the drum cartridge 40 moves upward to cause the photosensitive drum 41 to contact the intermediate transfer belt 63. In response to a developing pressing member being moved upward, the developing cartridge 50 moves upward to cause the developing roller 51 to contact the photosensitive drum 41 at a specified position.

According to the illustrative embodiment, the following effects may be achieved.

The end of the drum guide groove 24 on the opening 22A side has a width wider than the width of the leading end of the drum protrusion 46, thereby facilitating insertion of the drum cartridge 40 into the slot 22B.

The drum guide groove 24 of the main body casing 2 has a tapered shape and the drum protrusion 46 of a corresponding drum cartridge 40 has a tapered shape corresponding to the shape of the drum guide groove 24. Such a configuration may thus enable smooth insertion of the drum cartridge 40 into the slot 22B.

The end of the developing guide protrusion 26 on the opening 22A side has a width narrower than the width of the leading end of the developing groove 56, thereby facilitating insertion of the developing cartridge 50 to the slot 22B.

The developing guide protrusion 26 of the main body casing 2 has a tapered shape and the developing groove 56 of a corresponding developing cartridge 50 has a tapered shape corresponding to the shape of the developing guide protrusion 26. Such a configuration may thus enable smooth insertion of the developing cartridge 50 into the slot 22B.

The distance between the drum guide surface 25 and the lower outer circumferential surface of the intermediate transfer belt 63 on the opening 22A side is greater than the distance between the drum guide surface 25 and the lower outer circumferential surface of the intermediate transfer belt 63 on the sidewall 2A side. In insertion of the drum cartridge 40 into the slot 22B, such a configuration may thus enable the drum cartridge 40 to be inserted into the slot 22B from the position where the drum cartridge 40 is less susceptible to contact the intermediate transfer belt 63.

The distance between the developing guide surface 27 and the lower outer circumferential surface of the intermediate transfer belt 63 on the opening 22A side is greater than the distance between the developing guide surface 27 and the lower outer circumferential surface of the intermediate transfer belt 63 on the sidewall 2A side. In insertion of the developing cartridge 50 into the slot 22B, such a configuration may thus enable the developing cartridge 50 to be inserted into the slot 22B from the position where the developing cartridge 50 is less susceptible to contact the intermediate transfer belt 63.

The first protrusion D1 and the second protrusion D2 of the sidewall 2A of the main body casing 2 may be engaged with the drum elongated hole of the drum cartridge 40 and the developing elongated hole of the developing cartridge 50, respectively. The shapes of the drum elongated hole and the developing elongated hole may thus enable the drum cartridge 40 and the developing cartridge 50 to be contacted to and separated from the intermediate transfer belt 63, respectively.

While the disclosure has been described in detail with reference to the specific embodiment thereof, this is merely an example, and various changes, arrangements and modifications may be applied therein without departing from the spirit and scope of the disclosure.

In the illustrative embodiment, the cartridge guide portion 2B includes the drum guide grooves 24 and the developing guide protrusions 26 in or at its upper surface.

Nevertheless, in other embodiments, for example, a main body casing 2 may include drum guide protrusions instead of the drum guide grooves 24 and developing guide grooves instead of the drum guide protrusions 26. In such a case, each drum cartridge 40 may have a drum groove. In a state where a drum cartridge 40 is attached to a slot 22B, the drum groove may extend in the first direction and may be engaged with a corresponding one of the drum guide protrusions of the main body casing 2. Likewise, each developing cartridge 50 may include a developing protrusion. In a state where a developing cartridge 50 is attached to the slot 22B, the developing protrusion may extend in the first direction and may be engaged with a corresponding one of the developing guide grooves of the main body casing 2.

In a case where the main body casing 2 includes such drum guide protrusions, each drum guide protrusion may have a width in the second direction. The width of each drum guide protrusion may be increased toward the inside of the main body casing 2 (i.e., the sidewall 2A) from the opening 22A. The drum groove of the drum cartridge 40 may have a width in the second direction. In a state where the drum cartridge 40 is attached to the slot 22B, the width of the drum groove may be increased as the drum groove extends toward the inside of the main body casing 2 (i.e., the sidewall 2A) from the opening 22A.

In a case where the main body casing 2 includes such developing guide grooves, each developing guide groove may have a width in the second direction. The width of each developing guide groove may be decreased toward the inside of the main body casing 2 (i.e., the sidewall 2A) from the opening 22A. The developing protrusion of the developing cartridge 50 may have a width in the second direction. In a state where the developing cartridge 50 is attached to the slot 22B, the width of the developing protrusion may be decreased as the developing protrusion extends toward the inside of the main body casing 2 (i.e., the sidewall 2A) from the opening 22A.

In still other embodiments, a main body casing 2 may include drum guide grooves and developing guide grooves. In such a case, each drum cartridge 40 may include a drum protrusion and each developing cartridge 50 may include a developing protrusion.

In yet other embodiments, a main body casing 2 may include drum guide protrusions and developing guide protrusions. In such a case, each drum cartridge 40 may include a drum groove and each developing cartridge 50 may include a developing groove.

In yet other embodiments, a main body casing 2 may include at least one each of drum guide groove, drum guide protrusion, developing guide groove, and developing guide protrusion.

In the illustrative embodiment, the drum guide surface 25 and the developing guide surface 27 of the upper surface of the cartridge guide portion 2B are inclined toward the intermediate transfer belt 63 as the drum guide surface 25 and the developing guide surface 27 extend toward the inside of the main body casing 2 (i.e., the sidewall 2A) from the opening 22A.

Nevertheless, the drum guide surface 25 and the developing guide surface 27 might not necessarily be inclined toward the intermediate transfer belt 63 as the drum guide surface 25 and the developing guide surface 27 extend toward the inside of the main body casing 2 (i.e., the sidewall 2A) from the opening 22A. In other embodiments, for example, the drum guide surface 25 and the developing guide surface 27 may extend parallel to the lower outer circumferential surface of the intermediate transfer belt 63. In such a case, in a state where a drum cartridge 40 and a developing cartridge 50 are attached to the main body casing 2, the drum contactable surface 45 of the drum cartridge 40 may extend parallel to the first axis X1 of the photosensitive drum 41 and the developing contactable surface 55 of the developing cartridge 50 may extend parallel to the second axis X2.

In the illustrative embodiment, the main body casing 2 includes the first protrusions D1 and the second protrusions D2 at the sidewall 2A and the cover C includes the first protrusions C1 and the second protrusions C2.

Nevertheless, in other embodiments, for example, a main body casing 2 may have first elongated holes instead of the first protrusions D1 and second elongated holes instead of the second protrusions D2. In such a case, each drum cartridge 40 may include a drum protrusion. In a state where a drum cartridge 40 is attached to the main body casing 2, the drum protrusion may be engaged with a corresponding one of the first elongated holes of the main body casing 2. Likewise, each developing cartridge 50 may include a developing protrusion. In a state where a developing cartridge 50 is attached to the main body casing 2, the developing protrusion may be engaged with a corresponding one of the second elongated holes of the main body casing 2.

In the same manner, the cover C may have first elongated holes instead of the first protrusions C1 and second elongated holes instead of the second protrusions C2. In such a case, each drum cartridge 40 may include a drum protrusion and each developing cartridge 50 may include a developing protrusion. In still other embodiments, for example, a main body casing 2 may have first and second elongated holes and a cover C may include the first and second protrusions C1 and C2. In such a case, each drum cartridge 40 and each developing cartridge 50 may include a protrusion on the back side (i.e., on the sidewall 2A side) and an elongated hole on the entrance side (i.e., on the opening 22A side). In yet other embodiments, for example, a main body casing 2 may include the first and second protrusions D1 and D2 and a cover C may have first and second elongated holes. In such a case, each drum cartridge 40 and each developing cartridge 50 may have an elongated hole on the back side (i.e., on the sidewall 2A side) and a protrusion on the entrance side (i.e., on the opening 22A side).

In the illustrative embodiment, the main body casing 2 has four identical drum guide grooves 24 and four identical developing guide protrusions 26. All of the four drum cartridges 40 are identical to each other, and all of the four developing cartridges 50 are identical to each other. Nevertheless, in other embodiments, for example, developing cartridges 50 may include four developing cartridges each having either of a developing groove or a developing protrusion. The developing grooves or the developing protrusions of the four developing cartridges may have different widths.

Drum cartridges 40 may include four drum cartridges each having either of a drum protrusion or a drum groove. The drum protrusions or the drum grooves of the four drum cartridges may have the same width.

Figure 8:
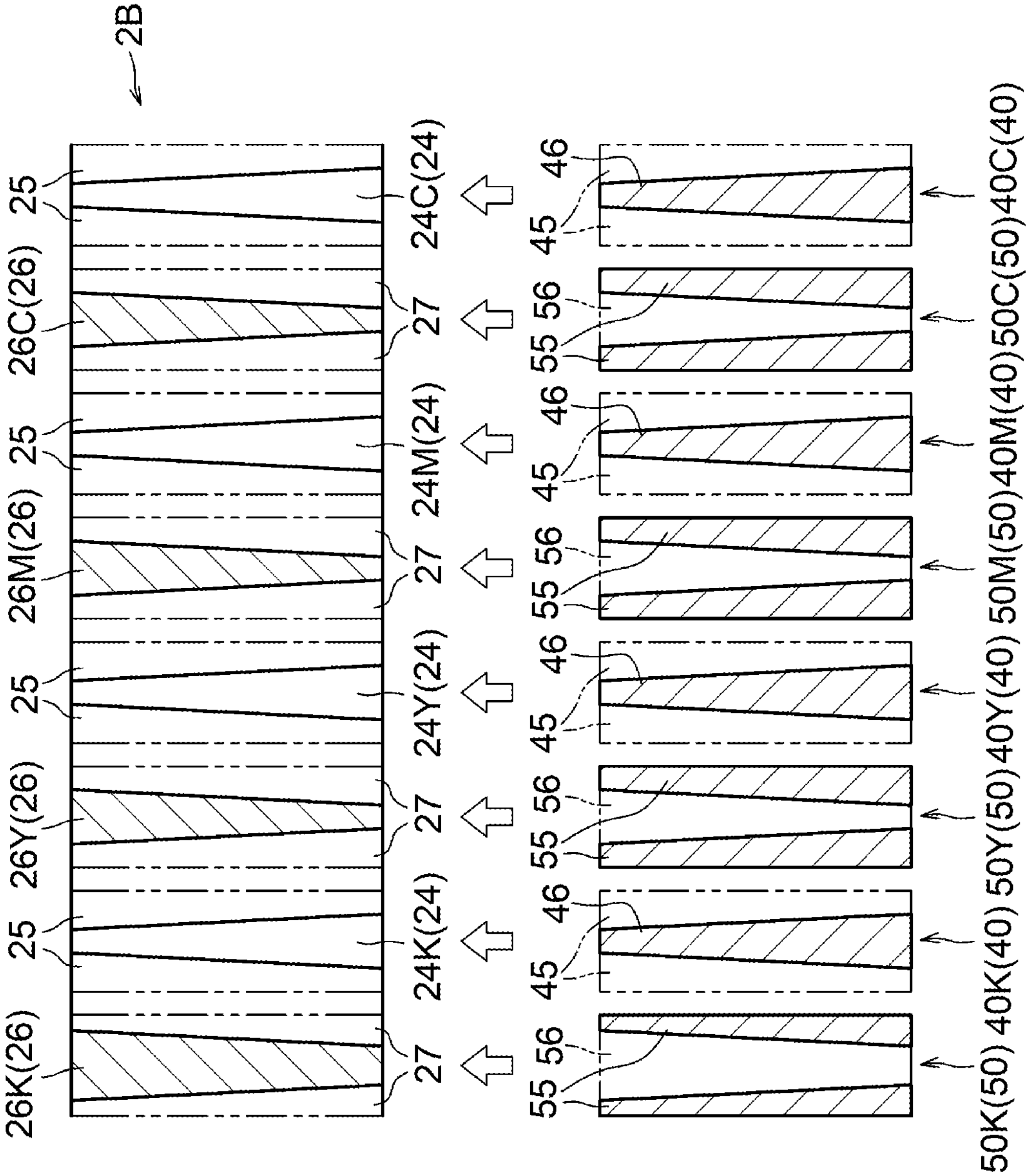
FIG. 8 is an explanatory diagram for explaining a relationship between a drum guide groove and a drum protrusion and a relationship between a developing guide protrusion and a developing groove according to a first modification.

More specifically, as illustrated in FIG. 8, in an example of a first modification, developing cartridges 50 include four developing cartridges 50K, 50Y, 50M, and 50C. The black developing cartridge 50K is an example of a first developing cartridge storing first color developer. Each of the other developing cartridges 50Y, 50M, and 50C is an example of a second developing cartridge storing second color developer. The color of the second color developer is different from the color of the first color developer.

As illustrated in FIG. 8, the developing cartridge 50K has a developing groove 56 having a width wider than a width of a developing groove 56 of each of the developing cartridges 50Y, 50M, and 50C in the second direction. More specifically, for example, a width of a leading end of the developing groove 56 of the developing cartridge 50K is wider than a width of a leading end of the developing groove 56 of each of the developing cartridges 50Y, 50M, and 50C. The developing grooves 56 of the developing cartridges 50Y, 50M, and 50C may have respective different widths.

Drum cartridges 40 include four drum cartridges 40K, 40Y, 40M, and 40C. The black drum cartridge 40K is an example of a first drum cartridge corresponding to the first developing cartridge. Each of the other drum cartridges 40Y, 40M, and 40C is an example of a second drum cartridge corresponding to a corresponding one of the second drum cartridges.

The drum cartridges 40 include respective drum protrusions 46 having the same width in the second direction. More specifically, for example, leading ends of the drum protrusions 46 of the developing cartridges 50K, 50Y, 50M, and 50C all have the same width.

A main body casing 2 has a first drum guide groove 24K and second drum guide grooves 24Y, 24M, and 24C in an upper surface of a cartridge guide portion 2B. The first drum guide groove 24K is configured to guide movement of the black drum cartridge 40K. The second drum guide groove 24Y is configured to guide movement of the yellow drum cartridge 40Y. The second drum guide groove 24M is configured to guide movement of the magenta drum cartridge 40M. The second drum guide groove 24C is configured to guide movement of the cyan drum cartridge 40C. The first drum guide groove 24K has a width in the second direction that may be the same as a width of each of the second drum guide grooves 24Y, 24M, and 24C in the second direction. More specifically, for example, an end of the first drum guide groove 24K on the opening 22A and ends of the second drum guide grooves 24Y, 24M, and 24C on the opening 22A side all have the same width.

The main body casing 2 further includes a first developing guide protrusion 26K and second developing guide protrusions 26Y, 26M, and 26C at the upper surface of the cartridge guide portion 2B. The first developing guide protrusion 26K is configured to guide movement of the black developing cartridge 50K. The second developing guide protrusion 26Y is configured to guide movement of the yellow developing cartridge 50Y. The second developing guide protrusion 26M is configured to guide movement of the magenta developing cartridge 50M. The second developing guide protrusion 26C is configured to guide movement of the cyan developing cartridge 50C. The first developing guide protrusion 26K and the second developing guide protrusions 26Y, 26M, and 26C have respective different widths corresponding to the widths of the developing grooves 56 of the corresponding developing cartridges 50. That is, the width of the first developing guide protrusion 26K in the second direction is different from the widths of the second developing guide protrusions 26Y, 26M, and 26C in the second direction. More specifically, for example, a width of a leading end of the first developing guide protrusion 26K on the opening 22A side is wider than widths of leading ends of the second developing guide protrusions 26Y, 26M, and 26C on the opening 22A side.

According to the above-described example of the first modification, the developing cartridges 50 have the respective developing grooves 56 having different widths based on color, thereby reducing misplacement of developing cartridges 50 into the main body casing 2.

The drum cartridges 40 may be common cartridges for the developing cartridges 50, thereby reducing a manufacturing cost.

In another example of the first modification, a main body casing 2 includes a first drum guide protrusion instead of the first drum guide groove 24K and second drum guide protrusions instead of the second drum guide grooves 24Y, 24M, and 24C. The main body casing 2 further includes a first developing guide groove instead of the first developing guide protrusion 26K and second developing guide grooves instead of the second developing guide protrusions 26Y, 26M, and 26C.

In such a case, a first drum cartridge 40K has a first drum groove. In a state where the first drum cartridge 40K is attached to the slot 22B, the first drum groove extends in the first direction and is engaged with the first drum guide protrusion of the main body casing 2. Each of the second drum cartridges 40Y, 40M, and 40C has a second drum groove. In a state where each of the second drum cartridges 40Y, 40M, and 40C is attached to the slot 22B, the second drum groove extends in the first direction and is engaged with a corresponding one of the second drum guide protrusions of the main body casing 2.

Likewise, a first developing cartridge 50K includes a first developing protrusion. In a state where the first developing cartridge 50K is attached to the slot 22B, the first developing protrusion extends in the first direction and is engaged with the first developing guide groove of the main body casing 2. Each of the second developing cartridges 50Y, 50M, and 50C includes a second developing protrusion. In a state where each of the second developing cartridges 50Y, 50M, and 50C is attached to the slot 22B, the second developing protrusion extends in the first direction and is engaged with a corresponding one of the second developing guide grooves of the main body casing 2.

The first drum guide protrusion has a width in the second direction that may be the same as a width of the second drum guide protrusion in the second direction. The first developing guide groove has a width in the second direction that may be different from a width of the second developing guide groove in the second direction.

Hereinafter, referring to FIGS. 9A, 9B, 9C, 10A, and 10B, second to six modifications will described. A description will be provided mainly for the components or elements different from the illustrative embodiment, and a description will be omitted for the common components or elements by assigning the same or similar reference numerals thereto.

Figure 9A:
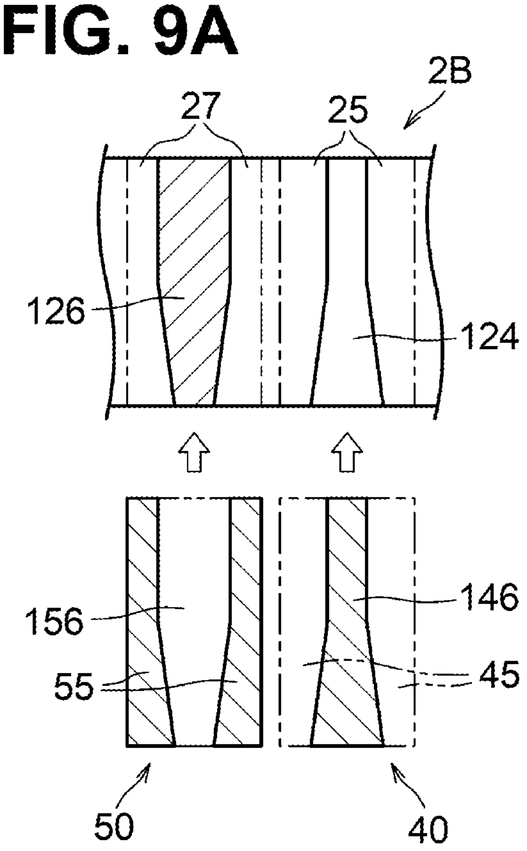
FIG. 9A is an explanatory diagram for explaining a relationship between a drum guide groove and a drum protrusion and a relationship between a developing guide protrusion and a developing groove according to a second modification.

As illustrated in FIG. 9A, in a second modification, for example, a cartridge guide portion 2B includes drum guide grooves 124 and developing guide protrusions 126 in or at its upper surface (only one each of the drum guide grooves 124 and the developing guide protrusions 126 are illustrated in FIG. 9A).

The drum guide groove 124 has a width in the second direction. The width of the drum guide groove 124 is decreased toward the inside of the main body casing 2 (i.e., the sidewall 2A) from the opening 22A to a particular position in the first direction. The drum guide groove 124 has a constant width from the particular position to its end on the sidewall 2A side.

The developing guide protrusion 126 has a width in the second direction. The width of the developing guide protrusion 126 is increased toward the inside of the main body casing 2 (i.e., the sidewall 2A) from the opening 22A to a particular position in the first direction. The developing guide protrusion 126 has a constant width from the particular position to the sidewall 2A.

Each drum cartridge 40 includes a drum protrusion 146 having a shape corresponding to a corresponding one of the drum guide grooves 124. Each developing cartridge 50 has a developing groove 156 having a shape corresponding to a corresponding one of the developing guide protrusions 126.

Such shapes of the grooves and protrusions may allow a large size difference at the entrance (i.e., the opening 22A), thereby facilitating insertion of a drum cartridge 40 and a developing cartridge 50 into the main body casing 2.

Figure 9B:
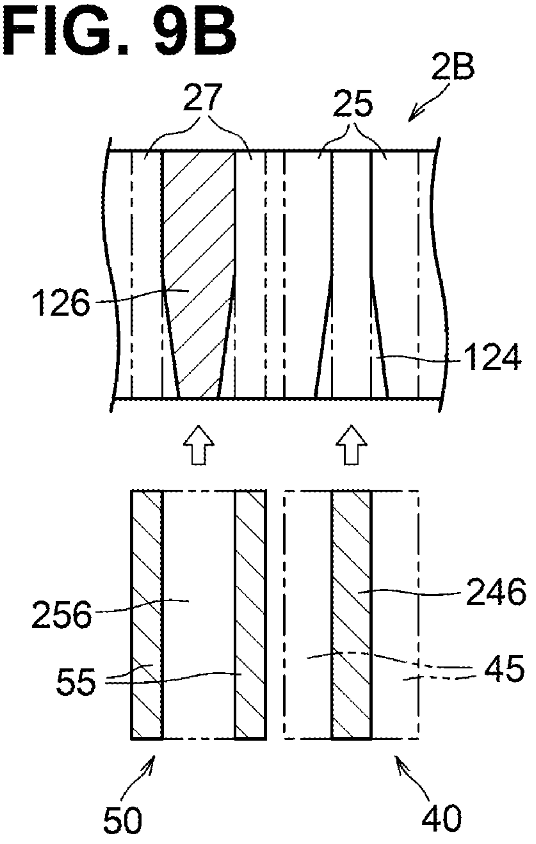
FIG. 9B is an explanatory diagram for explaining a relationship between a drum guide groove and a drum protrusion and a relationship between a developing guide protrusion and a developing groove according to a third modification.

As illustrated in FIG. 9B, in a third modification, for example, a main body casing 2 includes drum guide grooves 124 and developing guide protrusions 126 having the same configurations as those according to the second modification (only one each of the drum guide grooves 124 and the developing guide protrusions 126 are illustrated in FIG. 9B).

Each drum cartridge 40 has a drum protrusion 246 having a constant width corresponding to a width of a constant-width section of the drum guide groove 124. Each developing cartridge 50 has a developing groove 256 having a constant width corresponding to a width of a constant-width section of the developing guide protrusion 126.

Such shapes of the grooves and protrusions may allow a large size difference at the entrance (i.e., the opening 22A), thereby facilitating insertion of a drum cartridge 40 and a developing cartridge 50 into the main body casing 2.

Figure 9C:
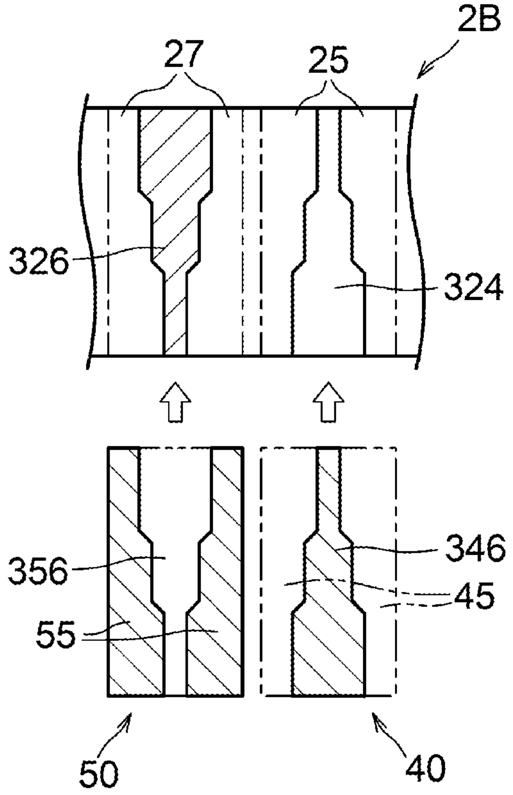
FIG. 9C is an explanatory diagram for explaining a relationship between a drum guide groove and a drum protrusion and a relationship between a developing guide protrusion and a developing groove according to a fourth modification.

As illustrated in FIG. 9C, in a fourth modification, for example, a main body casing 2 includes drum guide grooves 324 and developing guide protrusions 326 in or at an upper surface of a cartridge guide portion 2B (only one each of the drum guide grooves 324 and the developing guide protrusions 326 are illustrated in FIG. 9C).

The drum guide groove 324 has a width in the second direction. The width of the drum guide groove 324 is decreased stepwise toward the inside of the main body casing 2 (i.e., the sidewall 2A) from the opening 22A to the sidewall 2A.

The developing guide protrusion 326 has a width in the second direction. The width of the developing guide protrusion 326 is increased stepwise toward the inside of the main body casing 2 (i.e., the sidewall 2A) from the opening 22A to the sidewall 2A.

Each drum cartridge 40 includes a drum protrusion 346 having a shape corresponding to a corresponding one of the drum guide grooves 324. Each developing cartridge 50 includes a developing groove 356 having a shape corresponding to a corresponding one of the developing guide protrusions 326.

Such shapes of the grooves and protrusions may allow a large size difference at the entrance (i.e., the opening 22A), thereby facilitating insertion of a drum cartridge 40 and a developing cartridge 50 into the main body casing 2.

Figure 10A:
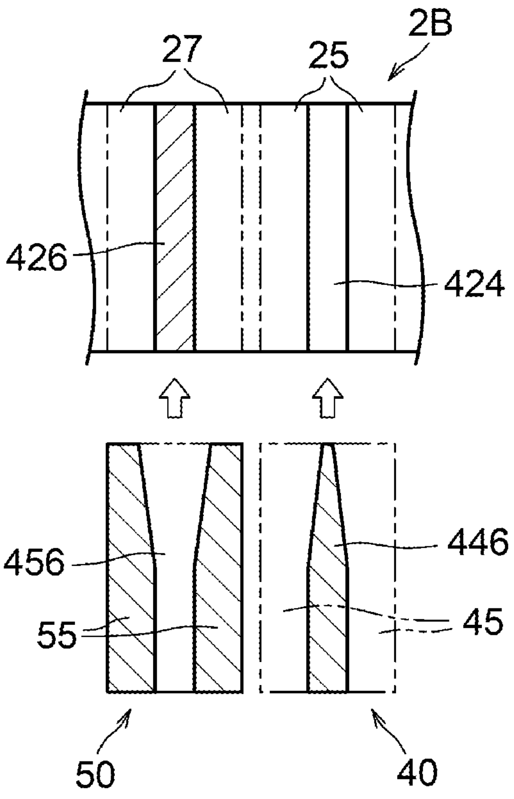
FIG. 10A is an explanatory diagram for explaining a relationship between a drum guide groove and a drum protrusion and a relationship between a developing guide protrusion and a developing groove according to a fifth modification.

As illustrated in FIG. 10A, in a fifth modification, for example, a main body casing 2 includes drum guide grooves 424 and developing guide protrusions 426 in or at an upper surface of a cartridge guide portion 2B (only one each of the drum guide grooves 424 and the developing guide protrusions 426 are illustrated in FIG. 10A).

The drum guide groove 424 has a width in the second direction. The drum guide groove 424 has a constant width from the opening 22A to the sidewall 2A.

The developing guide protrusion 426 has a width in the second direction. The developing guide protrusion 426 has a constant width from the opening 22A to the sidewall 2A.

Each drum cartridge 40 includes a drum protrusion 446 having a width in the second direction. In a state where a drum cartridge 40 is attached to the main body casing 2, the drum protrusion 446 has a constant width corresponding to the width of the drum guide groove 424 toward the sidewall 2A from the opening 22A to a particular position in the first direction. The width of the drum guide groove 124 is decreased toward the sidewall 2A from the particular position.

Each developing cartridge 50 includes a developing groove 456 having a width in the second direction. In a state where a developing cartridge 50 is attached to the main body casing 2, the developing groove 456 has a constant width corresponding to the width of the developing guide protrusion 426 toward the sidewall 2A from the opening 22A to a particular position in the first direction. The width of the developing groove 456 is increased toward the sidewall 2A from the particular position.

Such shapes of the grooves and protrusions may allow a large size difference at the entrance (i.e., the opening 22A), thereby facilitating insertion of a drum cartridge 40 and a developing cartridge 50 into the main body casing 2.

Figure 10B:
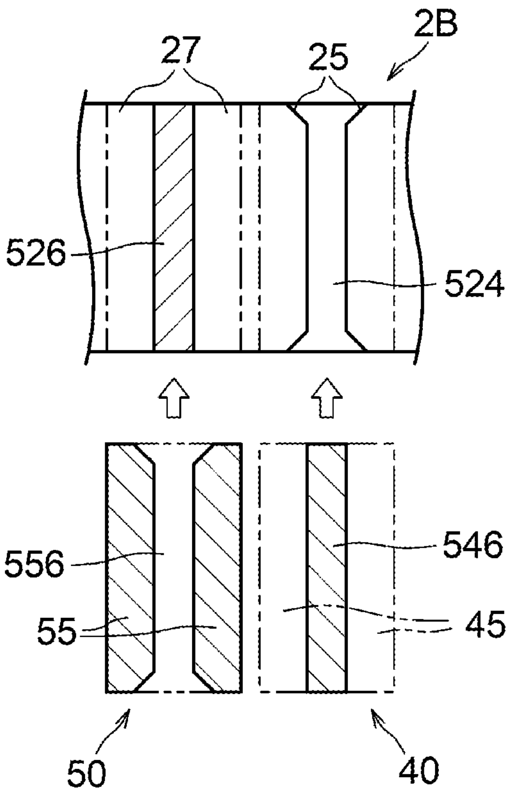
FIG. 10B is an explanatory diagram for explaining a relationship between a drum guide groove and a drum protrusion and a relationship between a developing guide protrusion and a developing groove according to a sixth modification.

As illustrated in FIG. 10B, in a sixth modification, for example, a main body casing 2 includes drum guide grooves 524 and developing guide protrusions 526 in or at an upper surface of a cartridge guide portion 2B (only one each of the drum guide grooves 524 and the developing guide protrusions 526 are illustrated in FIG. 10B).

The drum guide groove 524 has a width in the second direction. The width of the drum guide groove 524 is decreased toward the inside of the main body casing 2 from the opening 22A to a particular position and from the sidewall 2A to another particular position. The drum guide groove 524 has a section having a constant width between the particular positions in the first direction.

The developing guide protrusion 526 has a width in the second direction. The width of the developing guide protrusion 526 has a constant width from the opening 22A to the sidewall 2A.

Each drum cartridge 40 includes a drum protrusion 546 having a width in the second direction. In a state where a drum cartridge 40 is attached to the main body casing 2, the drum protrusion 546 has a constant width from the opening 22A to the sidewall 2A.

Each developing cartridge 50 has a drum guide groove 556 having a width in the second direction. In a state where a developing cartridge 50 is attached to the main body casing 2, the width of the drum guide groove 556 is decreased toward the inside of the main body casing 2 from the opening 22A to a particular position and from the sidewall 2A to another particular position. The drum guide groove 556 has a section having a constant width between the particular positions in the first direction.

Such shapes of the grooves and protrusions may allow a large size difference at the entrance (i.e., the opening 22A), thereby facilitating insertion of a drum cartridge 40 and a developing cartridge 50 into the main body casing 2.

In the above-described illustrative embodiment and modifications, the disclosure has been applied to the color printer 1. Nevertheless, the disclosure is not limited to the color printer 1. In other embodiments, for example, the disclosure may be applied to other image forming apparatuses such as monochrome printers, copying machines, and multifunction devices.

The elements described in the respective illustrative embodiment or modifications may be combined to implement the disclosure.

What is claimed is:

1. An image forming apparatus comprising:

a main body casing having an opening and a slot extending from the opening toward an inside of the main body casing along a first direction, the main body casing including a cover movable between an open position in which the cover does not cover the opening and a closed position in which the cover covers the opening and when the cover is in the closed position, the main body casing having an inner surface positioned at an innermost of the slot;

a drum cartridge including a photosensitive drum rotatable about a first axis extending in the first direction, the drum cartridge being removably insertable into the slot through the opening in the first direction; and a developing cartridge including a developing roller rotatable about a second axis extending in the first direction, the developing cartridge being removably insertable into the slot through the opening in the first direction, wherein the main body casing includes a drum guide groove configured to guide movement of the drum cartridge, the drum guide groove extending in the first direction, and wherein the drum guide groove has a tapered shape.

2. The image forming apparatus, according to claim 1, wherein the drum guide groove has opposite side surfaces including a first side surface and a second side surface, and wherein the first side surface has the tapered shape such that the first side surface is inclined relative to the first direction.

3. The image forming apparatus, according to claim 2, wherein the second side surface has the tapered shape such that the second side surface is inclined relative to the first direction.

4. The image forming apparatus, according to claim 1, wherein the drum cartridge is independently removable from the slot relative to the developing cartridge.

5. The image forming apparatus, according to claim 1, wherein the developing cartridge includes a first developing cartridge storing first color developer, wherein the developing cartridge includes a first developing side wall and a second developing side wall faced to the first developing cartridge in the first direction when the developing cartridge is attached to the slot, wherein one of the inner surface of the main body casing or the first developing side wall of the developing cartridge includes a second hole, and wherein the other of the inner surface of the main body casing or the first developing side wall of the drum cartridge includes a second protrusion configured to engage with the second hole when the developing cartridge is attached to the slot.

6. The image forming apparatus, according to claim 5, wherein the second protrusion protrudes from a side surface of the other of the inner surface of the main body casing or the first developing side wall of the developing cartridge in the first direction when the developing cartridge is attached to the slot.

7. The image forming apparatus, according to claim 5, wherein the first developing side wall of the developing cartridge includes the second hole, and wherein the inner surface of the main body casing includes the second protrusion.

8. The image forming apparatus, according to claim 1, wherein the main body casing includes a developing guide groove configured to guide movement of the developing cartridge, the developing guide groove extending in the first direction.

9. The image forming apparatus, according to claim 8, wherein the developing guide groove has a tapered shape.

10. The image forming apparatus, according to claim 1, further comprising an intermediate transfer belt positioned above the drum cartridge and the developing cartridge when the drum cartridge and the developing cartridge are attached to the slot.

11. The image forming apparatus, according to claim 1, further comprising a discharge unit including a discharge roller configured to convey a sheet, the discharge unit being positioned above the intermediate transfer belt.

12. The image forming apparatus, according to claim 1, wherein the drum cartridge and the developing cartridge are arranged in a second direction intersecting the first direction when the drum cartridge and the developing cartridge are attached to the slot.

* * * * *